(12) United States Patent
Jiang

(10) Patent No.: US 10,461,934 B2
(45) Date of Patent: Oct. 29, 2019

(54) AUTHENTICATION-BASED MESSAGE DISPLAY METHOD AND COMMUNICATION TERMINAL THEREOF

(71) Applicant: Huizhou TCL Mobile Communication Co., Ltd, Huizhou, Guangdong (CN)

(72) Inventor: Tingting Jiang, Huizhou (CN)

(73) Assignee: HUIZHOU TCL MOBILE COMMUNICATIONS CO., LTD, Huizhou (CN)

( * ) Notice: Subject to any disclaimer, the term of this patent is extended or adjusted under 35 U.S.C. 154(b) by 0 days.

(21) Appl. No.: 15/545,729

(22) PCT Filed: Dec. 6, 2016

(86) PCT No.: PCT/CN2016/108665
§ 371 (c)(1),
(2) Date: Jul. 24, 2017

(87) PCT Pub. No.: WO2017/173838
PCT Pub. Date: Oct. 12, 2017

(65) Prior Publication Data
US 2018/0123796 A1    May 3, 2018

(30) Foreign Application Priority Data
Apr. 8, 2016   (CN) .......................... 2016 1 0216874

(51) Int. Cl.
*H01L 29/06*     (2006.01)
*H04L 9/32*      (2006.01)
(Continued)

(52) U.S. Cl.
CPC .............. *H04L 9/3231* (2013.01); *G06F 3/16* (2013.01); *G06F 3/167* (2013.01); *G06K 9/0002* (2013.01);
(Continued)

(58) Field of Classification Search
CPC . H04L 63/0428; H04L 9/3231; H04L 9/3242; G06K 9/0002; G06K 9/00087;
(Continued)

(56) References Cited

U.S. PATENT DOCUMENTS 5,552,897 A * 9/1996 Mandelbaum ........ H04M 3/387
340/5.74
2005/0270140 A1* 12/2005 Oh ..................... G06K 9/00006
340/5.83

(Continued)

FOREIGN PATENT DOCUMENTS

CN       102065392 A       5/2011
CN       103067612 A       4/2013
(Continued)

OTHER PUBLICATIONS

International Search Report on corresponding PCT application (PCT/CN2016/108665) from International Searching Authority (CN) dated Feb. 15, 2017.

*Primary Examiner* — Syed A Zaidi

(57) ABSTRACT

The present disclosure discloses an authentication-based message display method and a communication terminal thereof. The method includes: a communication terminal determines whether a received message contains a setting content; marking the message as an encrypted message if contains; determining whether an authentication data which is inputted by a user and matches the encrypted message is obtained, when a display request for the encrypted message is received; displaying the encrypted message if obtained, and not displaying the encrypted message if not obtained. Through the above-mentioned method, it is possible to realize the encryption protection of messages, and prevent the message from being viewed by users who does not meet the requirements.

20 Claims, 4 Drawing Sheets

(51) Int. Cl.
*H04W 12/02* (2009.01)
*G06F 3/16* (2006.01)
*G06K 9/00* (2006.01)
*H04L 29/06* (2006.01)
*H04M 1/725* (2006.01)
*H04M 1/67* (2006.01)

(52) U.S. Cl.
CPC ..... *G06K 9/00087* (2013.01); *G06K 9/00228* (2013.01); *H04L 63/0428* (2013.01); *H04M 1/67* (2013.01); *H04M 1/72552* (2013.01); *H04M 1/72577* (2013.01); *H04W 12/02* (2013.01); *H04M 2250/22* (2013.01)

(58) Field of Classification Search
CPC .............. G06K 9/00228; H04W 12/02; H04M 1/72552; G06F 3/16
USPC ........................................................ 713/168
See application file for complete search history.

(56) References Cited

U.S. PATENT DOCUMENTS

| | | | | |
|---|---|---|---|---|
| 2006/0294377 | A1* | 12/2006 | Ho | H04L 63/0435 713/170 |
| 2010/0115289 | A1* | 5/2010 | Han | G06F 21/6209 713/189 |
| 2013/0145483 | A1* | 6/2013 | DiMuro | G06F 21/60 726/28 |
| 2014/0188970 | A1* | 7/2014 | Madhok | H04L 67/04 709/201 |
| 2014/0324912 | A1 | 10/2014 | Lei et al. | |
| 2015/0007351 | A1* | 1/2015 | Janajri | H04L 63/04 726/30 |
| 2018/0046844 | A1* | 2/2018 | Huang | G06F 21/32 |

FOREIGN PATENT DOCUMENTS

| | | |
|---|---|---|
| CN | 104348979 A | 2/2015 |
| CN | 104517069 A | 4/2015 |
| CN | 104899501 A | 9/2015 |
| CN | 105162693 A | 12/2015 |

\* cited by examiner

AUTHENTICATION-BASED MESSAGE DISPLAY METHOD AND COMMUNICATION TERMINAL THEREOF

CROSS-REFERENCE TO RELATED APPLICATIONS

The present application is a 35 U.S.C. § 371 National Phase conversion of International (PCT) Patent Application No. PCT/CN2016/108665 filed Dec. 6, 2016, which claims foreign priority of Chinese Patent Application No. 201610216874.X, filed on Apr. 8, 2016 in the State Intellectual Property Office of China, the contents of all of which are hereby incorporated by reference.

TECHNICAL FIELD

Embodiments of the present disclosure generally relate to communication technology, and in particular relate to an authentication-based message display method and a communication terminal thereof.

BACKGROUND

With the increasingly mature of communication technology, communication terminals such as mobile phones, computers have been widely used. Sending/receiving information such as short messages and social network platform messages is one of the basic functions of the communication terminals.

The communication terminal is usually a private terminal of a user, which contains privacy information of the user, especially for the messages with others. There are some message contents which the user wants to protect and prevent others from seeing. However, at present, the communication terminal merely protects user information by lock screen of the communication terminal. There is no protection for messages after the screen of the communication terminal is unlocked, and others can arbitrarily see the message contents in the communication terminal.

SUMMARY

The technical problem which the present disclosure mainly solves is to provide an authentication-based message display method and a communication terminal thereof, which is capable of realizing the encryption protection of messages and preventing the message from being viewed by users who does not meet the requirements.

In order to solve the above technical problem, a technical scheme adopted by the present disclosure is to provide an authentication-based message display method. The method includes: a communication terminal determines whether a received message contains a setting content; marking the message as an encrypted message if contains; determining whether an authentication data inputted by a user and matching the encrypted message is obtained, when a display request for the encrypted message is received; and displaying the encrypted message if obtained, and not displaying the encrypted message if not obtained.

In one embodiment, the marking the message as an encrypted message includes: setting a new added encryption flag bit in the structure of the message as a first identifier, wherein the first identifier indicates the message being an encrypted message; after a communication terminal determines whether a received message contains a setting content further includes: setting a new added encryption flag bit in the structure of the message as a second identifier, wherein the second identifier indicates the message being not an encrypted message.

In one embodiment, the determining whether the authentication data inputted by the user and matching the encrypted message is obtained when receiving the display request for the encrypted message includes: gathering fingerprint information of the user on a key of the communication terminal or a display screen of the communication terminal when receiving the display request for the encrypted message inputted by the user by pressing the key or touching a touch screen of the communication terminal; and determining whether the fingerprint information is consistent with a predetermined authentication data; wherein, if so, the fingerprint information is the authentication data matching the encrypted message; if not, the fingerprint information is not the authentication data matching the encrypted message.

In one embodiment, the setting content is at least one of a word, a graph, and a voice set in advance.

In one embodiment, the authentication data is at least one of characters, graphics, voiceprints, fingerprints, and face characteristics inputted by the user.

In one embodiment, the message is a short message.

In order to solve the above technical problem, another technical scheme adopted by the present disclosure is to provide a communication terminal including: a first determination module configured to determine whether a received message contains a setting content; a marking module configured to mark the message as an encrypted message if the received message contains the setting content; a second determination module configured to determine whether an authentication data inputted by a user and matching the encrypted message is obtained, when a display request for the encrypted message is received; and a display module configured to display the encrypted message if the authentication data inputted by the user and matching the encrypted message is obtained, and not display the encrypted message if the authentication data inputted by the user and matching the encrypted message is not obtained.

In one embodiment, the marking module is specifically configured to set a new added encryption flag bit in the structure of the message as a first identifier if the message contains the setting content, and set a new added encryption flag bit in the structure of the message as a second identifier if the message does not contain the setting content; wherein, the first identifier indicates the message being an encrypted message, the second identifier indicates the message being not an encrypted message.

In one embodiment, the second determination module includes: a gathering unit configured to gather fingerprint information of the user on a key of the communication terminal or a display screen of the communication terminal when receiving the display request for the encrypted message inputted by the user by pressing the key or touching a touch screen of the communication terminal; and a determination unit configured to determine whether the fingerprint information is consistent with a predetermined authentication data; wherein, if so, the fingerprint information is the authentication data matching the encrypted message; if not, the fingerprint information is not the authentication data matching the encrypted message.

In one embodiment, the setting content is at least one of a word, a graph, and a voice set in advance.

In one embodiment, the authentication data is at least one of characters, graphics, voiceprints, fingerprints, and face characteristics inputted by the user.

In one embodiment, the message is a short message.

In order to solve the above technical problem, still another technical scheme adopted by the present disclosure is to provide a communication terminal including: a processor, a storage coupled to the processor, a receiver, and a display screen. The receiver is configured to determine whether a received message contains a setting content. The display screen is configured to display the message according to indications of the processor. The storage is configured to store computer instructions. The processor executes the computer instructions and is configured to: determine whether a received message contains a setting content; mark the message as an encrypted message if the received message contains the setting content; determine whether an authentication data inputted by a user and matching the encrypted message is obtained, when a display request for the encrypted message is received; and indicate the display screen to display the encrypted message if the authentication data inputted by the user and matching the encrypted message is obtained, and not display the encrypted message if the authentication data inputted by the user and matching the encrypted message is not obtained.

In one embodiment, the processor is specifically configured to set a new added encryption flag bit in the structure of the message as a first identifier if the message contains the setting content, and set a new added encryption flag bit in the structure of the message as a second identifier if the message does not contain the setting content. The first identifier indicates the message being an encrypted message, the second identifier indicates the message being not an encrypted message.

In one embodiment, the processor is further configured to: gather fingerprint information of the user on a key of the communication terminal or a display screen of the communication terminal when receiving the display request for the encrypted message inputted by the user by pressing the key or touching a touch screen of the communication terminal; and determine whether the fingerprint information is consistent with a predetermined authentication data; wherein, if so, the fingerprint information is the authentication data matching the encrypted message; if not, the fingerprint information is not the authentication data matching the encrypted message.

In one embodiment, the setting content is at least one of a word, a graph, and a voice set in advance.

In one embodiment, the authentication data is at least one of characters, graphics, voiceprints, fingerprints, and face characteristics inputted by the user.

In one embodiment, the message is a short message.

In the above-mentioned schemes, the message is determined that whether the message is an encrypted message or not after the communication terminal receives the message. When the display request for the encrypted message which inputted by the user is received, the encrypted message is displayed if the authentication data inputted by the user is obtained, otherwise the encrypted message is not displayed, which realizes the encryption protection of the message and prevents the message from being viewed by users who does not meet the requirements. In addition, the communication terminal determines whether the message is an encrypted message or not by determining the content of the message, and does not need to process or change the message in the transmission terminal or the transmission process, which simplifies the encryption method while not affects the sending and the transmission efficiency of the message.

DETAILED DESCRIPTION

In the following description, for purposes of illustration and not by way of limitation, specific details such as specific system structures, interfaces, and techniques are set forth in order to provide a thorough understanding of the present disclosure. However, it will be apparent to those skilled in the art that the present disclosure may be implemented in other embodiments without these specific details. In other instances, detailed descriptions of well-known devices, circuits, and methods are omitted to avoid unnecessarily obscuring the description of the present disclosure.

Figure 1:
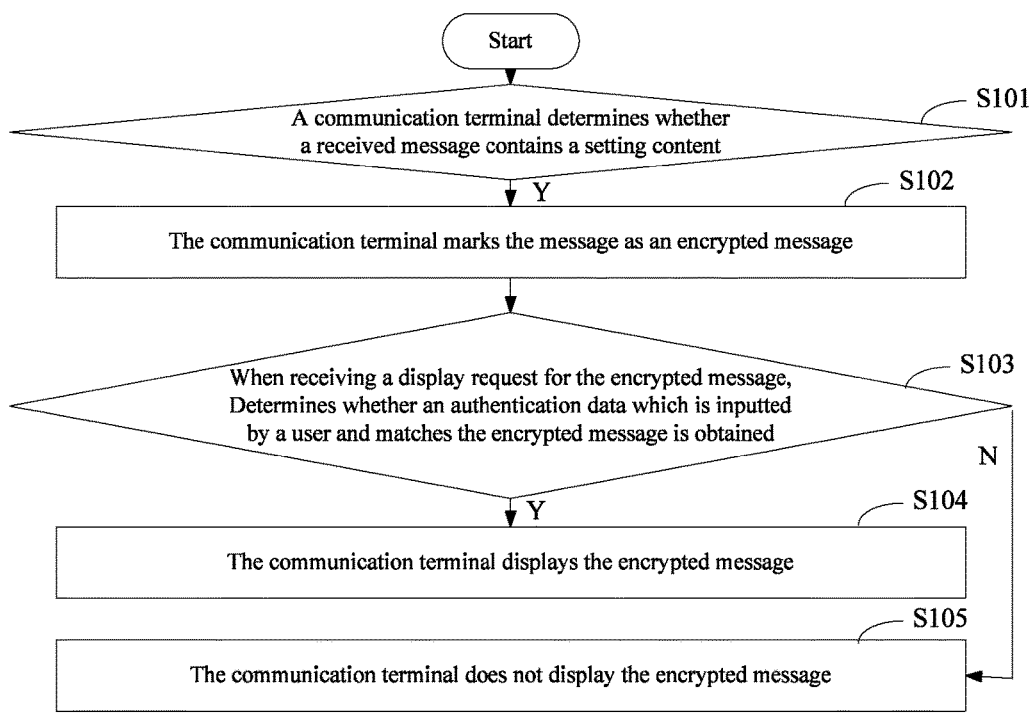
FIG. 1 is a flow chart of an embodiment of an authentication-based message display method of the present disclosure.

Referring to FIG. 1, a flow chart of an embodiment of an authentication-based message display method of the present disclosure is depicted. It is to be noted that, if substantially the same result, the method of the present disclosure is not limited to the flow order shown in FIG. 1. As shown in FIG. 1, the method includes the following blocks.

At S101: a communication terminal determines whether a received message contains a setting content. If the received message contains the setting content, S102 is executed; if the received message does not contain the setting content, waits for receiving a display request for the message which is inputted by a user, and directly display the message if received.

In one embodiment, the communication terminal can be any terminal capable of performing communication and display functions, for example, a mobile communication terminal such as a mobile phone, a tablet computer, and a notebook, or a desktop computer.

For instance, after receiving the message, the communication terminal parses the received message immediately or periodically to determine whether the message contains the setting content. The setting content can include but is not limited to at least one of a word, a graph and a voice which is set in advance, and the setting content can also include a plurality of words, graphs and voices.

It is to be comprehended that the communication terminal can store different types of setting contents in advance for different types of messages. For example, for text messages, the corresponding setting contents are words; for voice messages, the corresponding setting contents are voices. Correspondingly, after receiving the message, the communication terminal can determine the message type of the received message first, and then find the setting content of the corresponding type according to the message type to determine whether the message contains the found setting content.

At S102: the communication terminal marks (or tags) the message as an encrypted message.

For instance, the communication terminal adds an encryption flag bit to the structure of the received message according to a default setting for message reception. The flag bit is utilized to mark whether encrypted or not. Specifically, if the communication terminal sets the flag bit of the message as the first identifier, the message is indicated to be an encrypted message, and the user can only read by inputting an authentication data; if the flag bit of the message is set as the second identifier, the message is indicates to be not an encrypted message, and the user can read without inputting the authentication data. The first identifier and the second identifier can be set as any character or string which can be identified by the communication terminal. In a specific embodiment, one of the first identifier and the second identifier is 1 while the other is 0.

Of course, the communication terminal can also mark whether encrypted or not without adding a new flag bit, and can also mark through an original flag bit of the structure of the message. For instance, adding two new identifiers to the original flag bit of the structure of the message. The new identifiers are any character or string which was not previously used by the flag bit. Furthermore, the communication terminal can change the message type directly to a newly defined encrypted message type or increase the length of the message by one bit to represent an encrypted message, without utilizing the flag bit of the structure to mask. Hence, the specific method of marking the message which had been encrypted is not limited herein.

Optionally, when the communication terminal determines that the received message is an encrypted message, the contents of the encrypted message can be blurred in an inbox or a chat window, or the specific contents can be masked with other characters. Also, the communication terminal can further blur or mask the sender information and the sending time of the message, and use random words or a part of the keyword(s) of the message as the subject of the message, and only display the subject of the message.

The communication terminal waits for receiving the display request for the message which is inputted by the user after the message is marked as the encrypted message, if received, S103 is executed.

At S103: when the communication terminal receives the display request for the encrypted message, determines whether the authentication data which is inputted by a user and matches the encrypted message is obtained. If so, S104 is executed, or S105 is executed.

In one embodiment, the authentication data is at least one of characters, graphics, voiceprints, fingerprints, and face characteristics inputted by the user.

For instance, the communication terminal obtains the authentication data inputted by the user in advance and stores the authentication data for authenticating whether the encrypted message is allowed to display or not. The communication terminal can set different authentication data according to different message types (e.g., text, graphic, voice), or set different authentication data according to different message senders. Of course, different authentication data can also be set to correspond to each of different encrypted messages, or unified authentication data can be applied to all encrypted messages, which are not specifically limited by the present disclosure.

The communication terminal determines whether the message has been marked as an encrypted message or not when receiving an open instruction for the message which is inputted by the user (i.e., when the display request for the message is received), and if so, determines whether or not the authentication data which is inputted by the user and matches the encrypted message is obtained in a time set in advance, otherwise, the message is displayed directly. In another embodiment, the communication terminal can notify the user to input the authentication data after the message is determined to be an encrypted message, thereby obtaining the authentication data inputted by the user.

At S104: the communication terminal displays the encrypted message.

At S105: the communication terminal does not display the encrypted message.

When the authentication data inputted by the user is incorrect or the authentication data is not inputted in a time set in advance, the communication terminal does not display the encrypted message and informs that the user has no authority to access the message.

In this embodiment, after receiving the message, the communication terminal determines whether the message is an encrypted message or not. When the display request for the encrypted message which is inputted by the user is received, the encrypted message is displayed if the authentication data which is inputted by the user and matches the encrypted message is received, otherwise the encrypted message is not displayed. The communication terminal realizes the encryption protection of the message, and prevents the message from being viewed by unauthorized users. In addition, the communication terminal determines whether the message is an encrypted message or not by determining the content of the message, and does not need to process or change the message in the transmission terminal or the transmission process, which simplifies the encryption method while not affecting the sending and the transmission efficiency of the message.

Figure 2:
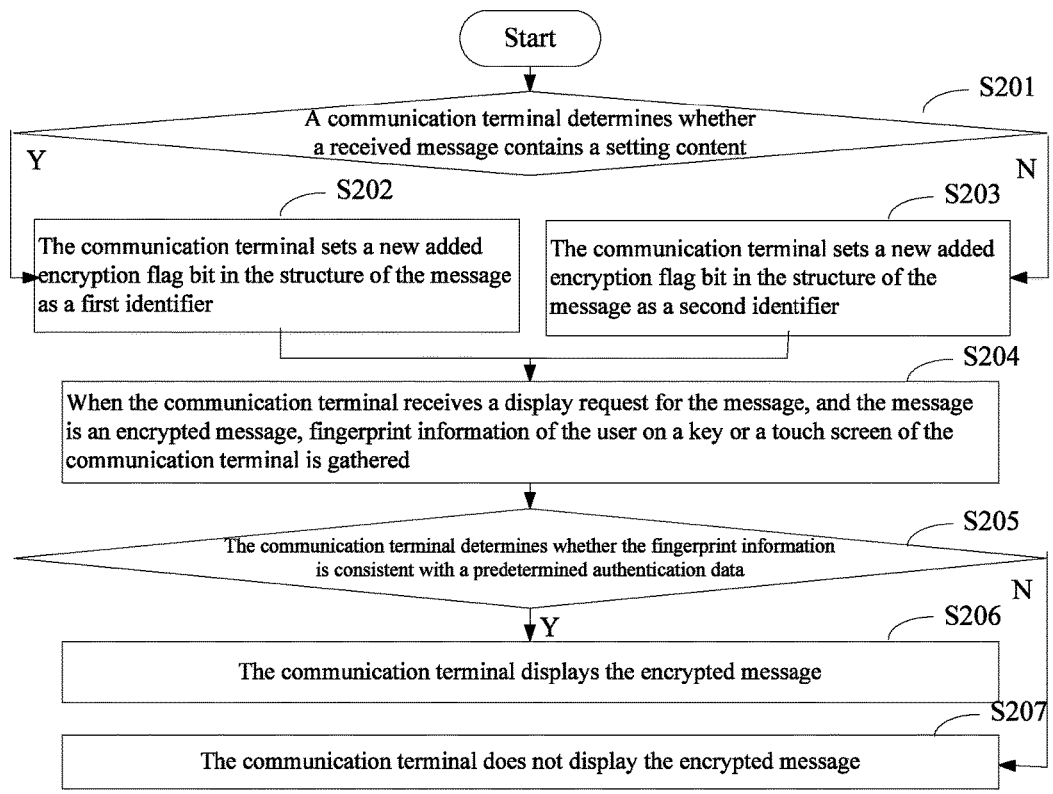
FIG. 2 is a flow chart of another embodiment of an authentication-based message display method of the present disclosure.

Referring to FIG. 2, a flow chart of another embodiment of an authentication-based message display method of the present disclosure is depicted. In this embodiment, the method includes the following blocks.

At S201: the communication terminal determines whether the received message contains the setting content. If contains, S202 is executed; otherwise, S203 is executed.

At S202: the communication terminal sets a new added encryption flag bit in the structure of the message as a first identifier.

At S203: the communication terminal sets a new added encryption flag bit in the structure of the message as a second identifier.

In one embodiment, the first identifier indicates that the message is an encrypted message, and the second identifier indicates that the message is not an encrypted message. For example, the first identifier is 1, and the second identifier is 0. After the setting is completed, the communication terminal waits for receiving the display request for the message which is inputted by the user.

One of the cases included by the above-mentioned S203 is: if the encrypted flag bit defaults to a second flag, that is, the encrypted flag bit of the structure of the message is the second flag before changed, the communication terminal already realizes setting the encrypted flag bit to the second flag essentially without any operation when the message does not contain the setting content, which is equivalent to directly wait for receiving the display request for the message which is inputted by the user.

About the specific descriptions of S201-S203, please refer to S101-S102 in the previous embodiment, which will not be repeated herein.

At S204: when the communication terminal receives the display request for the message which is inputted by the user through pressing a key of the communication terminal or touching a touch screen of the communication terminal, and the message is an encrypted message, fingerprint information of the user on the key or the touch screen is gathered.

In order to enhance the display speed and improve the user experience, this embodiment simultaneously gathers the user's fingerprint when performing the display request of the user. For example, at least one of the touch screen and the key of the communication terminal is provided with a fingerprint gathering unit. When the communication terminal receives the display request (e.g., an instruction to open the message) of the message generated by the user pressing the touch terminal of the communication terminal or touching the touch screen of the communication terminal, the message is determined whether or not being an encrypted message through the encryption flag of the message. If not an encrypted message, S205 is executed directly; if being an encrypted message, the communication terminal gathers the fingerprint information of the user through the fingerprint gathering unit on the button or the touch screen.

At S205: the communication terminal determines whether the fingerprint information is consistent with a predetermined authentication data. If so, S206 is executed; otherwise, S207 is executed.

The default authentication data of the communication terminal is the fingerprint information. If the gathered fingerprint information is determined to be consistent with the default fingerprint information, the fingerprint information is the authentication data which matches the encrypted message; if the gathered fingerprint information is determined to be inconsistent with the default fingerprint information, the fingerprint information is not the authentication data which matches the encrypted message.

At S206: the communication terminal displays the encrypted message.

At S207: the communication terminal does not display the encrypted message.

It is to be understood that the authentication data of this embodiment is the fingerprint information. In another embodiment, the authentication data can be voiceprint information. For instance, S204 can correspondingly include: when the communication terminal receives the display request for the message which is inputted by the user through a voice input device such as a microphone, and the message is an encrypted message, the voiceprint information of the user is extracted from the display request; S205 can correspondingly include: the communication terminal determines whether the voiceprint information is consistent with a predetermined authentication data. If so, S206 is executed; otherwise, S207 is executed.

Of course, the authentication data can also be other information data such as face features, characters, etc. Correspondingly, in the above-mentioned S204-S205, the communication terminal gathers the other information data to compare with the default other information data.

In the above-mentioned scheme, the message can be a short message of a short message service (SMS), or a social network platform message such as a WeChat message, a microblog message, a QQ message, a mail, etc. The source and the type of the message are not limited in the present disclosure.

Figure 3:
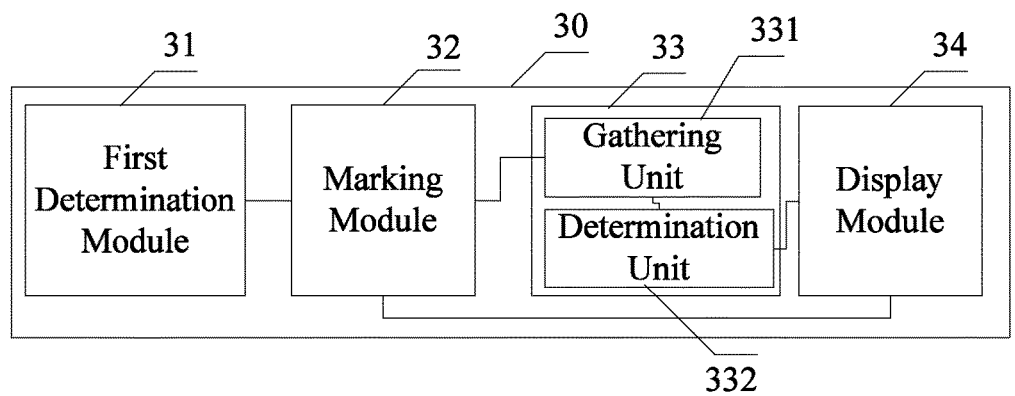
FIG. 3 is a schematic diagram of the structure of an embodiment of a communication terminal of the present disclosure.

Referring to FIG. 3, a schematic diagram of the structure of an embodiment of a communication terminal 30 of the present disclosure is depicted. In this embodiment, the communication terminal 30 is the communication terminal in the above-mentioned embodiment, which includes a first determination module 31, a marking module 32, a second determination module 33, and a display module 34.

The first determination module 31 is configured to determine whether the received message contains the setting content.

The marking (or tagging) module 32 is configured to mark (or tag) the message as an encrypted message if the received message contains the setting content.

The second determination module 33 is configured to determine whether the authentication data which is inputted by the user and matches the encrypted message is obtained, when the display request for the encrypted message is received.

The display module 34 is configured to display the encrypted message if the authentication data which is inputted by the user and matches the encrypted message is obtained, and not display the encrypted message if the authentication data which is inputted by the user and matches the encrypted message is not obtained.

Optionally, the marking module 32 is specifically configured to: set the new added encryption flag bit in the structure of the message as the first identifier if the message contains the setting content, and set the new added encryption flag bit in the structure of the message as the second identifier if the message does not contain the setting content.

In one embodiment, the first identifier indicates that the message is an encrypted message, the second identifier indicates that the message is not an encrypted message.

The display module 34 can also be configured to display a non-encrypted message directly when a display request for the non-encrypted message which is inputted by the user is received.

Optionally, the second determination module 33 includes a gathering unit 331 and a determination unit 332.

The gathering unit 331 is configured to gather the fingerprint information of the user on a key of the communication terminal 30 or a display screen of the communication terminal 30 when receiving the display request for the encrypted message inputted by the user by pressing the key or touching a touch screen of the communication terminal 30.

The determination unit 332 is configured to determine whether the fingerprint information is consistent with the predetermined authentication data. If so, the fingerprint information is the authentication data matching the encrypted message; if not, the fingerprint information is not the authentication data matching the encrypted message.

In another embodiment, the second determination module 33 can include an extraction unit and another determination unit. The extraction unit is configured to extract voiceprint information of the user from the display request when the display request for the message which is inputted by the user through a voice input device such as a microphone is received, and the message is an encrypted message. The another determination unit is configured to determine whether the voiceprint information is consistent with the predetermined authentication data. If so, the voiceprint information is the default authentication data matching the encrypted message, otherwise not.

Optionally, the setting content is at least one of a word, a graph, and a voice which is set in advance.

Optionally, the authentication data is at least one of characters, graphics, voiceprints, fingerprints, and face characteristics inputted by the user.

Optionally, the message is a short message.

Since each module of the above-mentioned communication terminals can respectively execute the corresponding steps in the above-mentioned method embodiments, the modules are not described herein. For details, please refer to the above descriptions of the corresponding steps.

Figure 4:
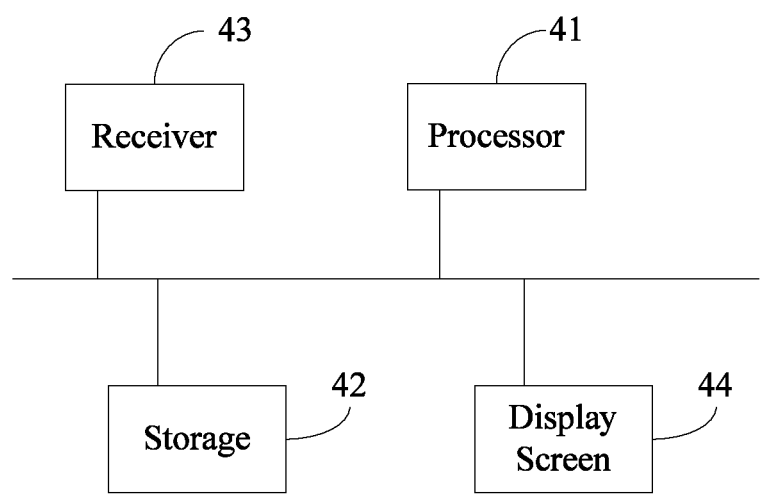
FIG. 4 is a schematic diagram of the structure of another embodiment of a communication terminal of the present disclosure.

Referring to FIG. 4, a schematic diagram of the structure of another embodiment of a communication terminal 40 of the present disclosure is depicted. The communication terminal 40 can execute the steps executed by the communication terminal in the above-mentioned method. For more information, please refer to the detailed description of the above-mentioned method, which will not be described herein.

In this embodiment, the communication terminal 40 includes a processor 41, a storage 42 coupled to the processor 41, a receiver 43, and a display screen 44.

The storage 42 is configured to store an operating system, instructions executed by the processor 41, the received messages, etc.

The receiver 43 is configured to receive the messages.

The display screen 44 is configured to display the messages according to indications of the processor 41.

The processor 41 is configured to: determine whether the message received by the receiver 43 contains the setting content; mark the message as an encrypted message if the message contains the setting content; determine whether the authentication data which is inputted by the user and matches the encrypted message is obtained when the display request for the encrypted message is received; and indicate the display screen 44 to display the encrypted message if the authentication data which is inputted by the user and matches the encrypted message is obtained; and indicate the display screen 44 not to display the encrypted message if the authentication data which is inputted by the user and matches the encrypted message is not obtained.

Optionally, the processor 41 is specifically configured to: set the new added encryption flag bit in the structure of the message as the first identifier if the message contains the setting content, and set the new added encryption flag bit in the structure of the message as the second identifier if the message does not contain the setting content.

In one embodiment, the first identifier indicates that the message is an encrypted message, the second identifier indicates that the message is not an encrypted message.

Optionally, the determine whether the authentication data which is inputted by the user and matches the encrypted message is obtained when the display request for the encrypted message is received which is executed by the processor 41 includes: gathering fingerprint information of the user on a key of the communication terminal 40 or a display screen of the communication terminal 40 when receiving the display request for the encrypted message inputted by the user by pressing the key or touching a touch screen of the communication terminal 40; and determining whether the fingerprint information is consistent with the predetermined authentication data; if so, the fingerprint information is the authentication data matching the encrypted message; if not, the fingerprint information is not the authentication data matching the encrypted message.

Optionally, the setting content is at least one of a word, a graph, and a voice which is set in advance.

Optionally, the authentication data is at least one of characters, graphics, voiceprints, fingerprints, and face characteristics inputted by the user.

Optionally, the message is a short message.

In the above-mentioned schemes, the message is determined whether the message is an encrypted message or not after the communication terminal receives the message. When the display request for the encrypted message inputted by the user is received, the encrypted message is displayed if the authentication data inputted by the user is obtained, otherwise the encrypted message is not displayed. The communication terminal, realizes the encryption protection of the message and prevents the message from being viewed by unauthorized users. In addition, the communication terminal determines whether the message is an encrypted message or not by determining the content of the message, and does not need to process or change the message in the transmission terminal or the transmission process, which simplifies the encryption method while not affecting the sending and the transmission efficiency of the message.

In the embodiments provided by the present disclosure, it is to be understood that the disclosed systems, apparatus and methods can be implemented in other ways. For example, the device embodiments described above are merely illustrative; the division of the modules or units is merely a division of logical functions, and can be divided in other ways such as combining or integrating multiple units or components with another system when being implemented; and some features can be ignored or not executed. In another aspect, the coupling such as direct coupling and communication connection which is shown or discussed can be implemented through some interfaces, and the indirect coupling and the communication connection between devices or units can be electrical, mechanical, or otherwise.

The units described as separated components can or cannot be physically separate, and the components shown as units can or cannot be physical units, that is, can be located in one place or distributed over a plurality of network elements. It is possible to select some or all of the units in accordance with the actual needs to achieve the object of the embodiments.

In addition, each of the functional units in each of the embodiments of the present disclosure can be integrated in one processing unit. Each unit can be physically exists alone, or two or more units can be integrated in one unit. The above-mentioned integrated unit can be implemented either in the form of hardware, or in the form of software functional units.

The integrated unit can be stored in a computer-readable storage medium if it is implemented in the form of a software functional unit and sold or used as a separate product. Based on this understanding, the technical solution of the present disclosure, either essentially or in part, contributes to the prior art, or all or a part of the technical solution can be embodied in the form of a software product. The software product is stored in a storage medium, which includes a number of instructions for enabling a computer device (which can be a personal computer, a server, a network device, etc.) or a processor to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The foregoing are merely embodiments of the present disclosure, and is not intended to limit the scope of the present disclosure. Any equivalent structure or flow transformation made based on the specification and the accompanying drawings of the present disclosure, or any direct or indirect applications of the disclosure on other related fields, shall all be covered within the protection of the present disclosure.

What is claimed is:

1. An authentication-based message display method, comprising:
    determining, by a communication terminal, whether a received message contains a setting content;
    marking, by the communication terminal, the message containing the setting content as an encrypted message;
    receiving, by the communication terminal, a display request for the encrypted message;

determining, by the communication terminal, whether an authentication data inputted by a user and matching the encrypted message is obtained; and displaying, by the communication terminal, the encrypted message matching the authentication data inputted by the user;

wherein after the determining, by the communication terminal, whether the received message contains the setting content, the method further comprises:

blurring contents, sender information and sending time of the received message containing the setting content in an inbox or a chat window; and displaying, in the inbox or the chat window, only a subject of the received message, wherein the subject of the received message is random words or a part of keywords of the received message.

2. The method of claim 1, wherein the marking the message containing the setting content as the encrypted message comprises:

setting a new added encryption flag bit in an structure of the message as a first identifier indicating the message is the encrypted message.

3. The method of claim 1, wherein the determining whether the authentication data inputted by the user and matching the encrypted message is obtained comprises:

gathering fingerprint information of the user on a key of the communication terminal or a display screen of the communication terminal when receiving the display request for the encrypted message inputted by the user by pressing the key or touching the display screen of the communication terminal; and determining whether the fingerprint information is consistent with a predetermined authentication data; wherein, if so, the fingerprint information is the authentication data matching the encrypted message; if not, the fingerprint information is not the authentication data matching the encrypted message.

4. The method of claim 1, wherein the setting content is at least one of a word, a graph, and a voice set in advance.

5. The method of claim 1, wherein the authentication data is at least one of characters, graphics, voiceprints, fingerprints, and face characteristics inputted by the user.

6. The method of claim 1, wherein the message is a short message.

7. The method of claim 1, further comprising:

setting a new added encryption flag bit in an structure of the received message not containing the setting content as a second identifier indicating the received message is not the encrypted message.

8. The method of claim 1, wherein the setting content is a content set in advance.

9. The method of claim 1, wherein the determining whether the received message contains the setting content comprises:

determining whether the received message contains a content same with the setting content stored in advance in the communication terminal.

10. A communication terminal comprising a processor, a storage coupled to the processor, a receiver, and a display screen, wherein:

the receiver is configured to receive a message;

the display is configured to display the message according to indications of the processor;

the storage is configured to store computer instructions; and the processor executes the computer instructions and is configured to:

determine whether a received message contains a setting content set in advance;

mark the message containing the setting content as an encrypted message;

determine whether an authentication data inputted by a user and matching the encrypted message is obtained in response to a display request for the encrypted message; and indicate the display screen to display the encrypted message matching the authentication data inputted by the user;

wherein when the received message is determined to contain the setting content set in advance, the processor further executes the computer instructions and is configured to:

blur contents, sender information and sending time of the received message containing the setting content in an inbox or a chat window; and display only a subject of the received message in the inbox or the chat window, wherein the subject of the received message is random words or a part of keywords of the received message.

11. The communication terminal of claim 10, wherein the processor is configured to set a new added encryption flag bit in a structure of the message containing the setting content as a first identifier, and set a new added encryption flag bit in the structure of the message not containing the setting content as a second identifier;

wherein the first identifier indicates the message is the encrypted message, and the second identifier indicates the message is not the encrypted message.

12. The communication terminal of claim 10, wherein the processor is further configured to:

gather fingerprint information of the user on a key of the communication terminal or a display screen of the communication terminal when receiving the display request for the encrypted message inputted by the user by pressing the key or touching the display screen of the communication terminal; and determine whether the fingerprint information is consistent with a predetermined authentication data; wherein, if so, the fingerprint information is the authentication data matching the encrypted message; if not, the fingerprint information is not the authentication data matching the encrypted message.

13. The communication terminal of claim 10, wherein the setting content is at least one of a word, a graph, and a voice set in advance.

14. The communication terminal of claim 10, wherein the authentication data is at least one of characters, graphics, voiceprints, fingerprints, and face characteristics inputted by the user.

15. The communication terminal of claim 10, wherein the message is a short message.

16. A non-transitory computer readable storage medium having instructions stored thereon, the instructions, when executed by one or more processors, cause a processor to perform operations comprising:

determining whether a received message contains a setting content set in advance;

marking the message containing the setting content as an encrypted message;

determining whether an authentication data inputted by a user and matching the encrypted message is obtained in response to a display request for the encrypted message is received; and indicating the display screen to display the encrypted message matching the authentication data inputted by the user:

wherein after the determining whether the received message contains the setting content set in advance, the processor further to perform operations comprising:

blurring contents, sender information and sending time of the received message containing the setting content in an inbox or a chat window; and displaying, in the inbox or the chat window, only a subject of the received message, wherein the subject of the received message is random words or a part of keywords of the received message.

17. The non-transitory computer readable storage medium of claim 16, the operations further comprise:

setting a new added encryption flag bit in a structure of the message containing the setting content as a first identifier, and setting a new added encryption flag bit in the structure of the message not containing the setting content as a second identifier;

wherein the first identifier indicates the message is the encrypted message, and the second identifier indicates the message is not the encrypted message.

18. The non-transitory computer readable storage medium of claim 16, the operations further comprise:

gathering fingerprint information of the user on a key of the communication terminal or a display screen of the communication terminal when receiving the display request for the encrypted message inputted by the user by pressing the key or touching the display screen of the communication terminal; and determining whether the fingerprint information is consistent with a predetermined authentication data; wherein, if so, the fingerprint information is the authentication data matching the encrypted message; if not, the fingerprint information is not the authentication data matching the encrypted message.

19. The non-transitory computer readable storage medium of claim 16, wherein the setting content is at least one of a word, a graph, and a voice set in advance.

20. The non-transitory computer readable storage medium of claim 16, wherein the authentication data is at least one of characters, graphics, voiceprints, fingerprints, and face characteristics inputted by the user.

* * * * *